(12) United States Patent
Koponen

(10) Patent No.: US 6,839,420 B1
(45) Date of Patent: Jan. 4, 2005

(54) METHOD FOR TRANSFERRING THE SERVICE PROFILE OF A DIGITAL SUBSCRIPTION TO A DIGITAL TERMINAL DEVICE

(75) Inventor: Teuvo Koponen, Oulu (FI)

(73) Assignee: Nokia Corporation, Espoo (FI)

( * ) Notice: Subject to any disclaimer, the term of this patent is extended or adjusted under 35 U.S.C. 154(b) by 467 days.

(21) Appl. No.: 09/620,163

(22) Filed: Jul. 20, 2000

Related U.S. Application Data

(63) Continuation of application No. PCT/FI99/00022, filed on Jan. 14, 1999.

(30) Foreign Application Priority Data

Jan. 23, 1998 (FI) .................................... 980149

(51) Int. Cl.[7] .............................................. H04M 3/42
(52) U.S. Cl. .............. 379/219; 379/201.01; 379/201.05
(58) Field of Search ................................ 379/230, 219, 379/201.01, 201.02, 201.03, 201.04, 201.05, 201.12, 204.01, 156, 157

(56) References Cited

U.S. PATENT DOCUMENTS

| | | |
|---|---|---|
| 5,206,899 A | 4/1993 | Gupta et al. |
| 5,414,752 A | 5/1995 | Jonsson |
| 5,425,097 A | 6/1995 | Pula |
| 5,485,511 A | 1/1996 | Iglehart et al. |
| 5,701,419 A | 12/1997 | McConnell |
| 5,774,671 A | 6/1998 | Satoh |

FOREIGN PATENT DOCUMENTS

| | | |
|---|---|---|
| CA | 2218789 | 10/1997 |
| FI | 92536 | 8/1994 |
| FI | 962351 | 12/1997 |
| FI | 102128 | 9/1998 |
| FI | 964961 | 9/1998 |
| JP | 09120405 | 5/1997 |
| WO | 95/23482 | 8/1995 |
| WO | 97/08636 | 3/1997 |

*Primary Examiner*—William J. Deane, Jr.
(74) *Attorney, Agent, or Firm*—Squire, Sanders & Dempsey, L.L.P.

(57) ABSTRACT

The present invention relates to a method for transferring the service profile of a digital subscription to a digital terminal device in a telecommunication network. According to the invention, the services activated for use by the subscriber as well as associated complementary data are transferred from the digital telephone exchange to the digital terminal device.

7 Claims, 2 Drawing Sheets

Figure 1A:
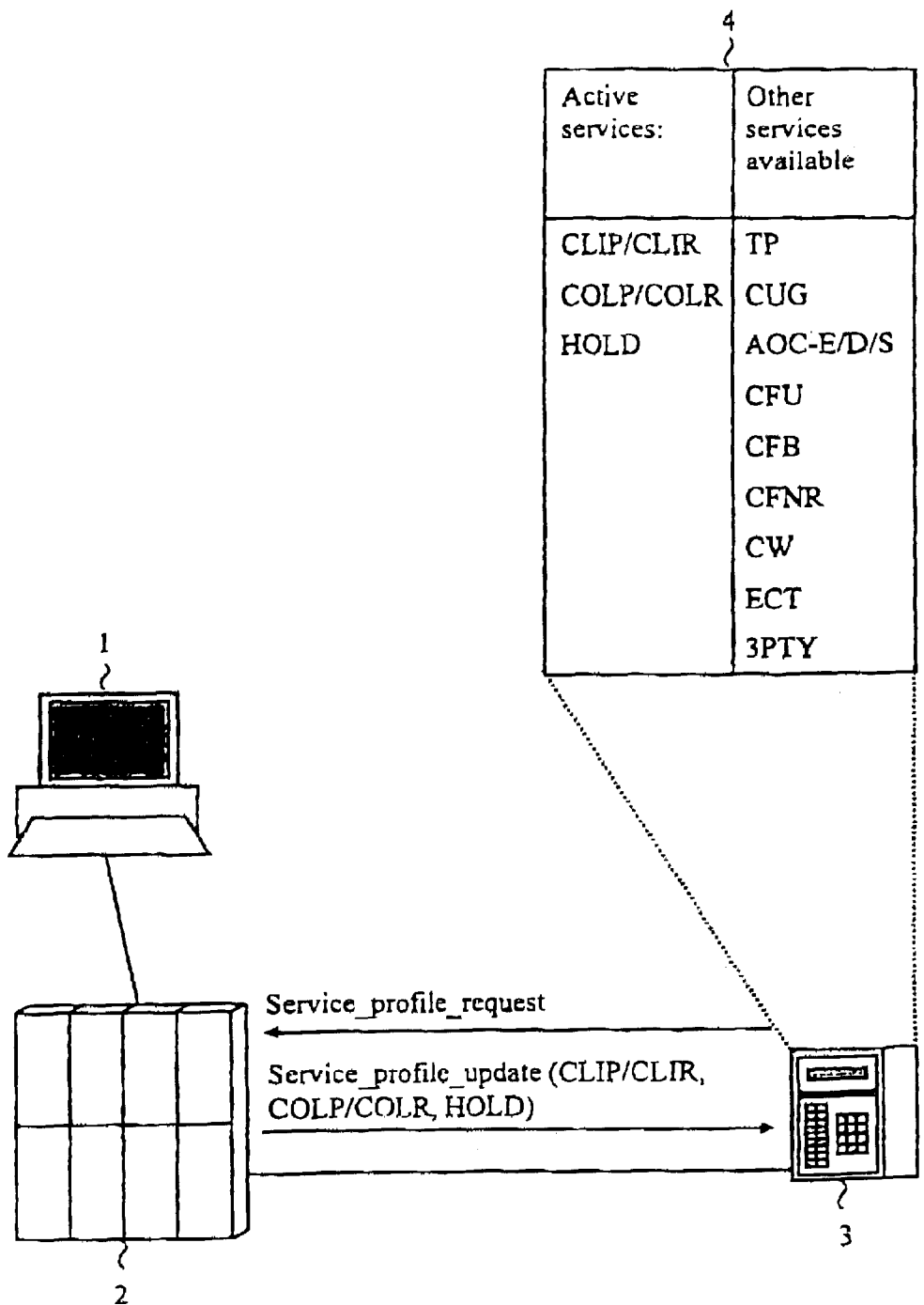

METHOD FOR TRANSFERRING THE SERVICE PROFILE OF A DIGITAL SUBSCRIPTION TO A DIGITAL TERMINAL DEVICE

This application is a continuation of international application serial number PCT/FI99/00022, filed 14 Jan. 1999.

The present invention relates to a method as defined in the preamble of claim 1, in which the service profile of a digital subscription is transferred from a digital telephone exchange to a digital terminal device.

Subscribers with digital subscriber lines, such as ISDN (Integrated Services Digital Network, ISDN) subscriber lines and mobile telephone subscriptions consistent with the GSM standard, have access to a large variety of different additional services that a digital subscriber line makes possible. Moreover, it is to be expected that the number of additional services will further increase in the near future. For the use of a given service, it is necessary that the service be implemented both in the telephone exchange and in the terminal equipment. Typically, each subscriber uses an individual choice of services. Yet the terminal presents all the services that have been implemented in that terminal, regardless of which services are included in the subscriber's choice of services.

The problem is that inevitably a situation will arise where the properties menu of the subscriber's terminal device presents a large number of services that are unavailable for use by the subscriber because those services have not been subscribed to. On the other hand, the services that have been activated for use by the subscriber are lost in an irrelevantly large selection of services, with the result that the subscriber does not know which ones of the services presented are available.

The object of the present invention is to disclose a completely new type of method to eliminate the drawbacks mentioned above.

A specific object of the present invention is to disclose a method by which the properties menu of terminal equipment can be matched to each subscriber's individual choice of services.

As for the features characteristic of the present invention, reference is made to the claims.

The method of the invention relates to a telephone network which comprises a digital telephone exchange comprising digital subscriber lines with digital terminal equipment connected to them. In the method of the invention, between the digital telephone exchange and a digital terminal device, the service profile of the digital subscription in question is transferred to the terminal device. The service profile transferred to the terminal device comprises the services currently activated for use by the subscriber, updated, as well as service status data relating to the active services.

As compared with prior art, the present invention provides the advantage that that only those services that have been activated for use by the subscriber are presented in the properties menu of the subscriber terminal, instead of presenting all possible services in the properties menu. The services available for use are not lost in an excessively large selection, and the subscriber can immediately see which services have been activated. Thus, the invention facilitates and simplifies the use of subscriber terminal equipment and services, because the terminal equipment displays the active services and the relevant service status data. Moreover, the present invention makes it possible for the teleoperator to transfer to the subscriber terminal all services offered by the telephone exchange, grouped according to whether the service has been activated for use by the subscriber or whether the service can be activated for use by the subscriber from the telephone exchange. Thus, the teleoperator has an easy method for marketing services implemented in the exchange.

In an embodiment of the method, all the services available in a digital telephone exchange are transferred from the exchange to a digital terminal device, said services being grouped into services activated for use by the subscriber and services available to activated for use.

In an embodiment of the method, the transfer of service profile is performed upon start-up of the digital terminal device and/or upon connection of the digital terminal device to the telecommunication network, in which case the digital terminal device sends a transfer request to the telephone exchange.

In an embodiment of the method, the transfer of service profile is performed after changes made by the teleoperator in the subscriber's service profile, e.g. when the teleoperator adds/removes services for the subscriber using MML commands (Man-Machine Language, MML).

In an embodiment of the method, upon receiving the service profile, the digital terminal device configures the properties menus in its software so that the services activated for use by the subscriber together with possible status data are presented in a separate menu while the services available to be activated for use are presented in a separate menu.

In an embodiment of the method, the digital terminal device is GSM compatible.

In an embodiment of the method, the digital terminal device is ISDN compatible.

Figure 1B:
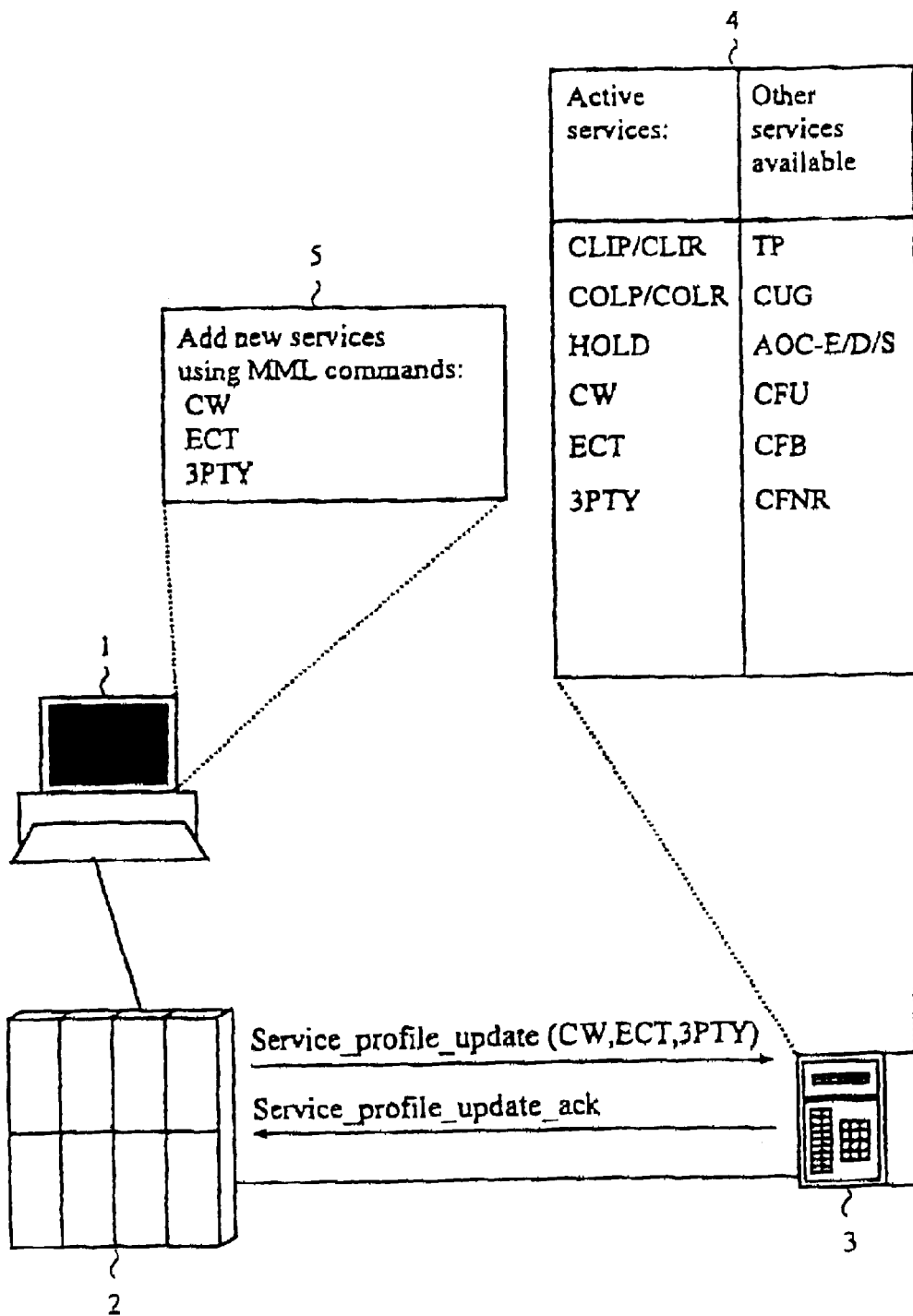

In the following, the invention will be described by the aid of a few examples of its embodiments by referring to the attached drawing, wherein FIGS. 1a and 1b represent embodiments of the method of the invention.

FIG. 1a shows an example illustrating a service profile inquiry from subscriber terminal equipment 3. When the ISDN terminal 3 is connected to the network, the terminal 3 sends to the digital telephone exchange 2 a request to update the service profile. The telephone exchange 2 receives the request and checks the data stored in the telephone exchange 2 about the subscriber to determine which services have been activated for use by the subscriber, as well as any status data relating to them. Since the teleoperator 1 has selected the option that all services existing in the telephone exchange 2, grouped into services activated for use and services available, are to be transmitted to the subscriber in response to the subscriber's service profile request, the telephone exchange 2 determines these data as well from the subscriber data and performs the grouping into services activated for use and services available. The telephone exchange 2 sends the service profile for the subscriber to the terminal equipment 3. Upon receiving the service profile, the terminal equipment 3 configures the service menus 4 in its software so that the subscriber will be able to see in a separate menu the services activated for use (Calling Line Identification Presentation CLIP/Calling Line Identification Restriction CLIR, Connected Line Identification Presentation COLP/Connected Line Identification Restriction COLR, Call Hold HOLD) together with supplementary data and in another separate menu the services available (Terminal Portability TP, Closed User Group CUG, Advice of Charge AOC-E/D/S, Call Forwarding Unconditional CFU, Call Forwarding Busy CFB, Call Forwarding No Reply CFNR, Call Waiting CW, Explicit Call Transfer ECT, Three Party Service 3PTY).

FIG. 1b presents an example illustrating the modification of service profile by the teleoperator. When the teleoperator changes the subscriber's service profile using MML commands (Man-Machine Language, MML) e.g. by adding the services Call Plaiting CW, Explicit Call Transfer ECT and Three Party Service 3PTY for the subscriber, the digital telephone exchange 2 checks the data stored in the telephone exchange 2 about the subscriber to determine the services activated for use by that subscriber as well as the status data relating to them. Since the teleoperator 1 has selected the option that all services existing in the telephone exchange 2, grouped into services activated for use and services available, are to be transmitted to the subscriber in response to the subscriber's service profile request, the telephone exchange 2 determines those data as well from the subscriber data and performs the grouping into services activated for use and services available. The telephone exchange 2 sends the service profile for the subscriber to the terminal equipment 3. Upon receiving the service profile, the terminal equipment 3 configures the service menus 4 in its software so that the subscriber will be able to see in a separate menu the services activated for use (Calling Line Identification Presentation CLIP/Calling Line Identification Restriction CLIR, Connected Line Identification Presentation COLP/Connected Line Identification Restriction COLR, Call Hold HOLD, Call Waiting CW, Explicit Call Transfer ECT, Three Party Service 3PTY) together with supplementary data and in another separate menu the services available (Terminal Portability TP, Closed User Group CUG, Advice of Charge AOC-E/D/S, Call Forwarding Unconditional CFU, Call Forwarding Busy CFB, Call Forwarding No Reply CFNR).

The invention is not restricted to the examples of its embodiments described above, but many variations are possible within the scope of the inventive idea defined by the claims.

What is claimed is:

1. Method for transferring a service profile of a subscriber to a digital terminal device and for displaying the service profile with the digital terminal device in a telecommunication network, which comprises a digital telephone exchange comprising digital subscriber lines connected to digital terminal equipment, the method comprising:

initiating a transfer of the service profile of a subscriber at the digital telephone exchange;

determining in the digital telephone exchange which services have been activated for use by the subscriber;

determining in the digital telephone exchange status data relating to the activated services of the subscriber;

transferring an updated list of services currently activated for use by the subscriber from the digital telephone exchange to the digital terminal device;

transferring updated service status data relating to the services currently activated for use by the subscriber from the digital telephone exchange to the digital terminal device; and displaying the updated list of services currently activated for use with the digital terminal device.

2. Method as defined in claim 1, further comprising:

grouping all services available at the digital telephone exchange into services activated for use by the subscriber and services available to be activated for use;

transferring the grouped services from the exchange to the digital terminal device; and displaying the services with the digital terminal device by grouping the services activated for use by the subscriber and services available to be activated for use.

3. Method as defined in claim 1, wherein the transfer of service profile is performed upon at least one of a start-up of the digital terminal device and upon connection of the digital terminal device to the telecommunication network, in which case the digital terminal device sends a transfer request to the digital telephone exchange.

4. Method as defined in claim 1, wherein the transfer of service profile is performed after a change made by a teleoperator in a service profile of the subscriber.

5. Method as defined in claim 1, wherein upon receiving the service profile, the digital terminal device configures properties menus in software of the digital terminal device so that the services activated for use by the subscriber, together with status data, are presented in a separate menu while the services available to be activated for use are presented in another separate menu.

6. Method as defined in claim 1, wherein the digital terminal device is GSM compatible.

7. Method as defined in claim 1, wherein the digital terminal device is ISDN compatible.

* * * * *